US006233375B1

(12) United States Patent
Lang et al.

(10) Patent No.: US 6,233,375 B1
(45) Date of Patent: *May 15, 2001

(54) INTEGRATED OPTICS COMPONENT WITH POLARIZATION EFFECT

(75) Inventors: Thiemo Lang, Goeppingen (DE); Pierre Benech, Grenoble (FR)

(73) Assignee: Schneider Electric SA (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,918

(22) Filed: Mar. 24, 1998

(30) Foreign Application Priority Data

Apr. 7, 1997 (FR) .................................. 97 04435

(51) Int. Cl.[7] ...................................... G02B 6/12
(52) U.S. Cl. .......................... 385/14; 385/122; 359/326; 359/328; 359/332
(58) Field of Search .................... 385/14, 122; 359/326, 359/328, 332

(56) References Cited

U.S. PATENT DOCUMENTS 5,836,073 * 11/1998 Mizuuchi et al. .................... 359/332

FOREIGN PATENT DOCUMENTS

| 38 02 925 A1 | 8/1989 | (DE) . |
| 195 00 135 | 7/1996 | (DE) . |
| 195 30 461 | 2/1997 | (DE) . |
| 0 129 463 A1 | 12/1984 | (EP) . |
| 0 731 367 A2 | 9/1996 | (EP) . |
| 0 735 389 A1 | 10/1996 | (EP) . |

OTHER PUBLICATIONS

Patent Abstracts of Japan, vol. 016, No. 182 (P–1346), Apr. 30, 1992 & JP 04 021828 A (Hikari Keisoku Gijutsu Kaihatsu KK), Jan. 24, 1992 *abstract*.

* cited by examiner

Primary Examiner—Rodney Bovernick
Assistant Examiner—Ellen E. Kim
(74) Attorney, Agent, or Firm—Parkhurst & Wendel, L.L.P.

(57) ABSTRACT

The component comprises structures, achieved in integrated optics, exerting predetermined stresses on a light wave guiding waveguide so as to maintain or modify in predetermined manner the polarization state of an incident light wave. These structures are formed by at least one segmented plane waveguide arranged laterally with respect to the light wave guiding waveguide and formed by parallel lateral waveguides perpendicular to the longitudinal axis of the light wave guiding waveguide. These structures are achieved at the same time as the light wave guiding waveguide, the segmented plane waveguides having refractive indexes lower than or equal to those of the light wave guiding waveguide. Such structures can be arranged symmetrically or asymmetrically, alternately on each side of the light wave guiding waveguide.

8 Claims, 8 Drawing Sheets

INTEGRATED OPTICS COMPONENT WITH POLARIZATION EFFECT

BACKGROUND OF THE INVENTION

The invention relates to an integrated optics component with polarization effect comprising a substrate, at least one light wave guiding waveguide formed at the level of the substrate and designed to transmit a light wave applied to an input of the light wave guiding waveguide, and, at the level of the substrate, at least one segmented plane waveguide arranged laterally with respect to the light wave guiding waveguide and formed by a plurality of lateral waveguides parallel to one another, separated from one another by a space and forming a right angle with a longitudinal axis of the light wave guiding waveguide.

In a large number of applications using optical sensors and high bit-rate optical transmission devices, it is essential to have a well-defined state of polarization of the light wave. Moreover, the polarization sensitivity of anisotropic integrated optical components designed for use in optical switches, commutators, filters and amplifiers is a serious problem which can be overcome by using devices enabling the polarization to be modified.

The document U.S. Pat. No. 4,778,234 describes an integrated optical polarizing device with spatial polarization separation. In this device, interaction regions are obtained by modifying the material of a substrate, itself highly anisotropic, in controlled manner by doping or ion substitution. Doping of the interaction regions is performed in such a way that these regions have an index respectively lower than and higher than those of a light wave guiding waveguide for first and second polarization directions. In this way, the component of a wave having the second polarization direction ceases to be guided.

In this type of device, the light corresponding to one of the polarizations is eliminated and can no longer be recovered. There is consequently a loss of energy and, in certain cases, a loss of information. This type of device only enables two polarizations to be separated, but does not in any case enable a rotation of polarization to be performed.

SUMMARY OF THE INVENTION

The object of the invention is to achieve an integrated optics component with polarization effect enabling the polarization state of the light to be adjusted in predetermined manner, i.e. either maintaining this polarization state or modifying it in predetermined manner. It must enable any type of polarizer to be achieved or a rotation of polarization to be performed.

According to the invention, this object is achieved by the fact that the light wave guiding and segmented plane waveguides are achieved simultaneously, the refractive indexes of the segmented plane waveguide being lower than or equal to the refractive indexes of the light wave guiding waveguide.

The lateral segmented plane waveguides act on the anisotropy of the light wave guiding waveguide by mechanical stresses and geometry effects, thus producing a waveguide with high birefringence.

According to a first development of the invention, the component comprises segmented plane waveguides arranged symmetrically on each side of the light wave guiding waveguide. The light wave guiding waveguide then presents polarization state preservation properties, while at the same time maximizing the birefringence of the light wave guiding waveguide.

According to a second development of the invention, the component comprises segmented plane waveguides arranged asymmetrically on each side of the light wave guiding waveguide. By this asymmetrical disturbance of the index profile, the principal axis or axes of the light wave guiding waveguide are tilted and this enables devices modifying the polarization state of the light to be achieved.

To reduce the losses between the light wave guiding waveguide and the segmented plane waveguide, it is possible to arrange the segmented plane waveguide at a preset distance, preferably less than a few tens of micrometers, from the light wave guiding waveguide.

To increase the stresses, the component can comprise at least one additional plane waveguide arranged parallel to the longitudinal axis of the light wave guiding waveguide, at the end of an associated segmented plane waveguide opposite to the light wave guiding waveguide.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
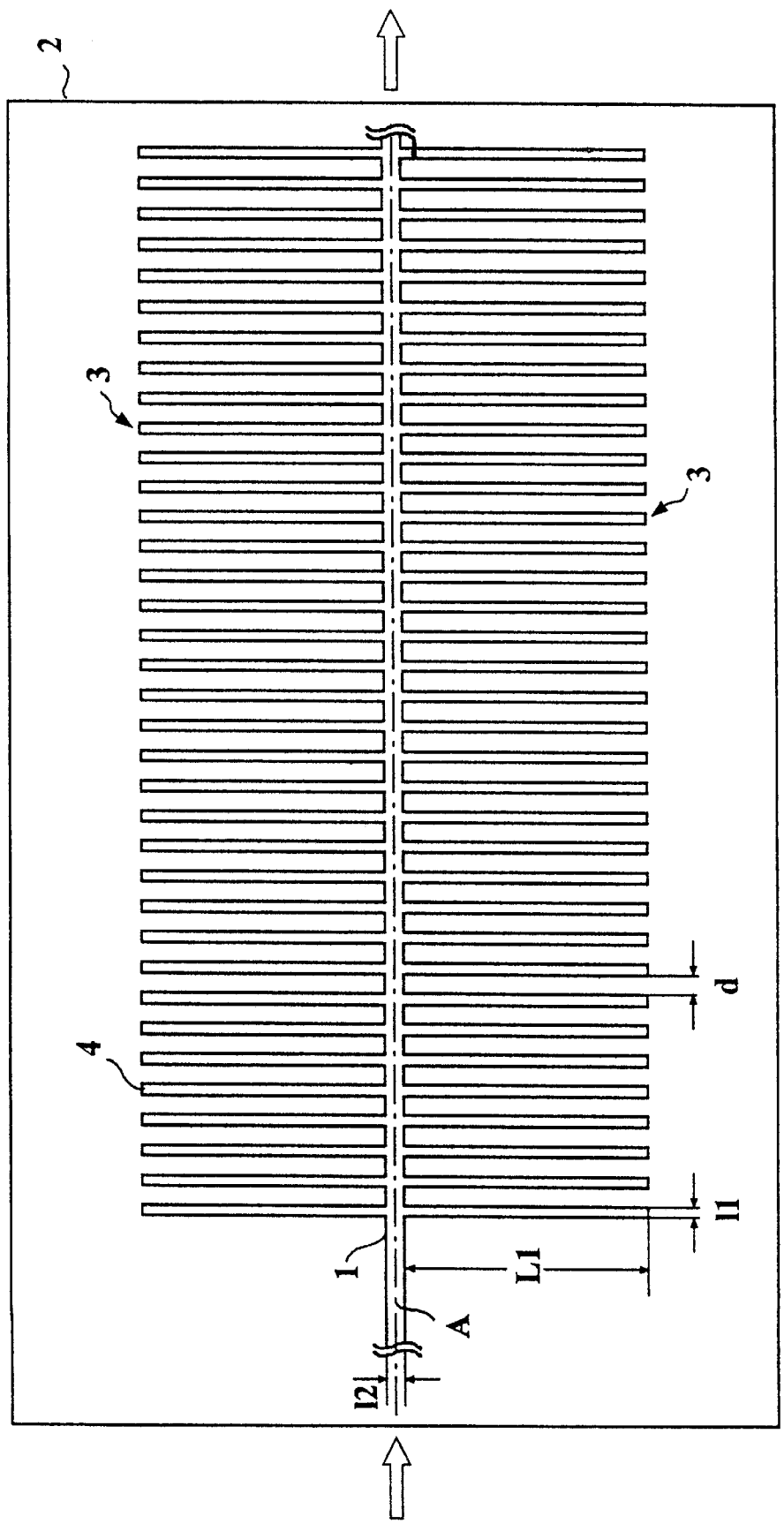
FIGS. 1 to 3 illustrate three particular embodiments of a component according to the invention wherein the disturbances are symmetrical with respect to the longitudinal axis of the light wave guiding waveguide.

In FIG. 1, a light wave guiding waveguide 1 is achieved by integrated optics techniques in a substrate 2. Arrows at the left and the right of FIG. 1 indicate the direction of propagation of a light wave in the guide 1. In a preferred embodiment, the substrate 2 is a glass substrate and the guide 1 is achieved, in known manner, by ion exchange. In the course of the ion exchange, mechanical stresses cause anisotropic modifications of the refractive index in the guide and consequently the guide 1 thus obtained is a birefringent guide. A guide of this type is not sufficiently birefringent when predetermined polarization effects are to be obtained.

Applying suitable additional stresses or disturbances on the guide 1 enables the latter to be made highly birefringent.

According to the invention, these additional stresses or disturbances are produced by structures comprising at least one segmented plane waveguide 3 arranged laterally with respect to the guide 1. These structures applying the additional stresses or disturbances on the guide 1 are formed in the substrate at the same time as the guide 1. The mask designed to form the guide 1 in fact simply has to be adapted and, by ion exchange, the guide 1 and the plane guides 3 can be obtained at the same time without any additional stage.

In the embodiment represented, a segmented plane waveguide 3 is formed by a set of lateral waveguides 4, of width I1 and length L1, parallel to one another, separated by a distance d and perpendicular to the longitudinal axis A of the guide 1.

Figure 2:
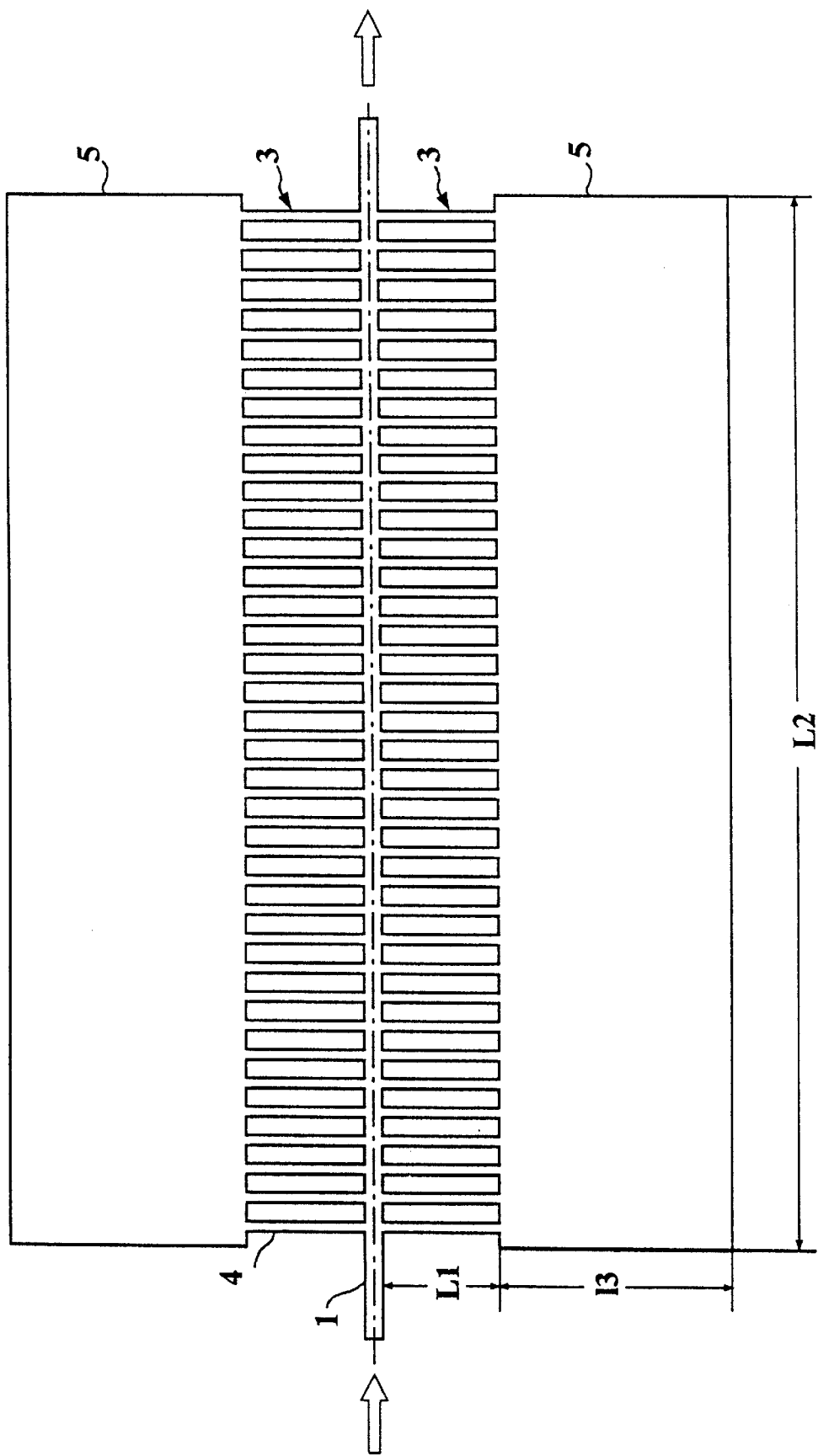

In FIGS. 1 and 2, the guide 1, of width I2, periodically cuts, at right angles, the lateral waveguides 4 arranged symmetrically on each side of the waveguide 1. The lateral waveguides 4 periodically increase the lateral component of the stress exerted on the guide 1, in the direction of propagation of the light. They thus periodically increase the birefringence of the guide 1.

The lateral guides 4 being narrow and perpendicular to the axis A of the guide 1, there are few losses, the light circulating in the guide 1 being hardly diffracted into the lateral guides. Symmetrical application of stresses on the guide 1 enables an anisotropic guide 1 with good polarization preserving characteristics to be obtained.

To increase the stresses exerted on the guide 1, additional plane waveguides 5 may be formed in the substrate, as represented in FIG. 2, A guide 5 of width I3 and length L2 is disposed, parallel to the longitudinal axis A of the guide 1, at the end of an associated segmented plane waveguide 3 opposite the guide 1. Thus, in FIG. 2, guides 5 are arranged on each side of the guide 1 at a distance L1 from the latter on the external part of the component. The distance L1 must be sufficient to prevent losses by coupling from the guide 1 to the guide 5.

Figure 3:
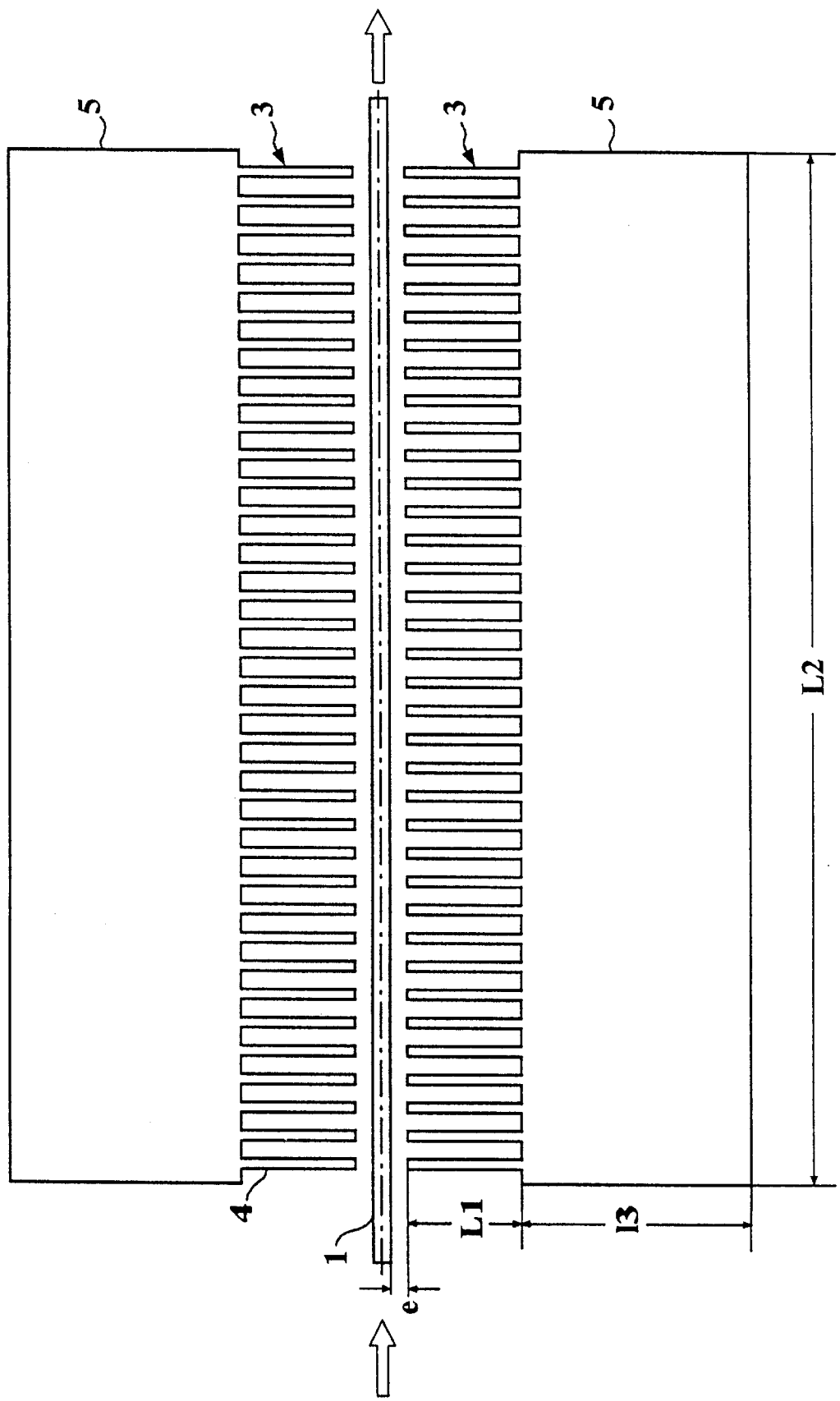

The particular embodiment represented in FIG. 3 is distinguished from the component in FIG. 2 by the fact that the lateral waveguides 4 are not in contact with the waveguide 1 but are located at a distance e from the waveguide 1. The distance e, typically less than a few tens of micrometers, enables the residual couplings and therefore the losses to be reduced, and improves guiding of the light by the guide 1. The stresses applied by the guides 4 on the guide 1 are then reduced in comparison with the embodiments of FIGS. 1 and 2.

Figure 4:
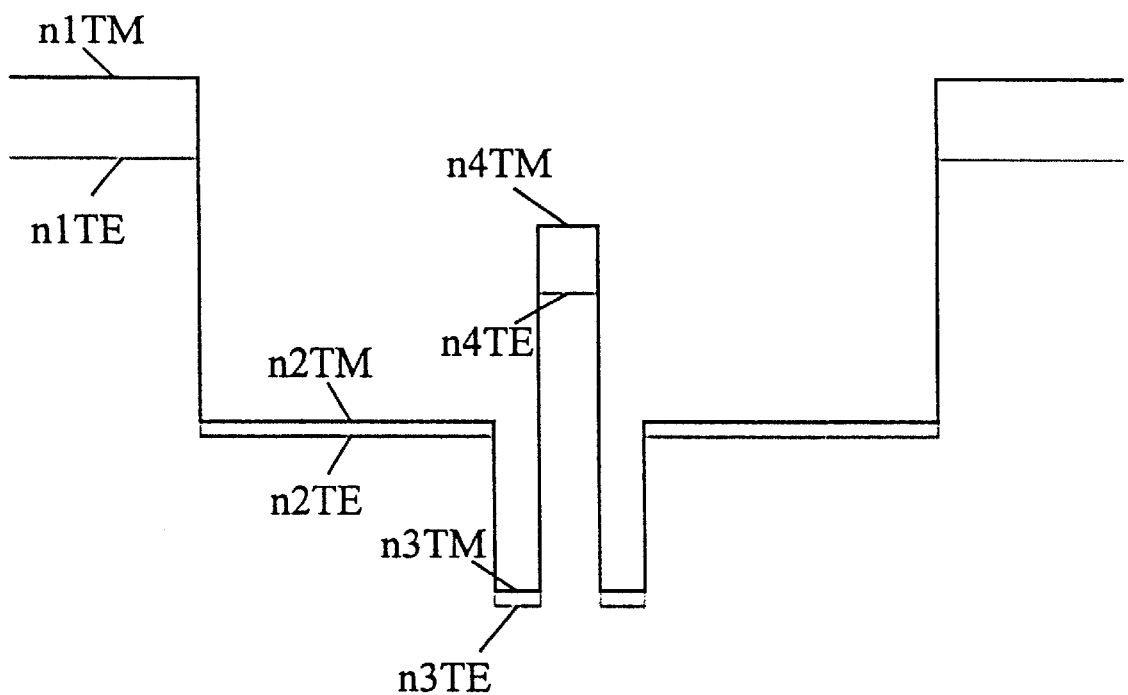
FIG. 4 represents the index variations in the component according to FIG. 3.

FIG. 4 illustrates the variations of the refractive indexes nTM (continuous line) and nTE (broken line) respectively for the polarization states TM and TE in the component according to FIG. 3.

The waveguides being formed simultaneously, their refractive indexes depend essentially on their dimensions. The latter are chosen in such a way that the refractive indexes in the segmented plane guides are lower than or equal to the refractive indexes in the light wave guiding waveguide 1, thus preventing optical leaks in the direction of the segmented plane guides. In practice, the narrower a waveguide, the lower its refractive indexes.

Analysis of the variations of the index in FIG. 4 shows, considering these variations from left to right, that the indexes nTM and nTE which have high first values n1TM and n1TE in the additional guide 5, decrease to medium values n2TM and n2TE in the segmented plane guide 3, then take very low values n3TM and n3TE in the space separating the segmented plane guide 3 from the guide 1, before again reaching high values n4TM and n4TE in the guide 1. The variations of index are symmetrical with respect to the guide 1. The distance e between the guides 1 and 3 improves guiding of the light in the guide 1. The additional guide 5 has an index n1 higher than the index n4 of the guide 1.

The large distance existing between the additional guide 5 and the guide 1 prevents any leakage from one to the other although the indexes of the additional guide 5 are, due to its large surface, higher than those of the guide 1.

The components according to FIGS. 1 to 3 enable very birefringent waveguides to be obtained providing a good preservation of the polarization state of the light. They can be used in particular in manufacture of phase splitters and polarizers. The embodiment of FIG. 3 can more particularly be used to create a polarizer by means of the tunnel effect applied to the TE mode.

Figure 5:
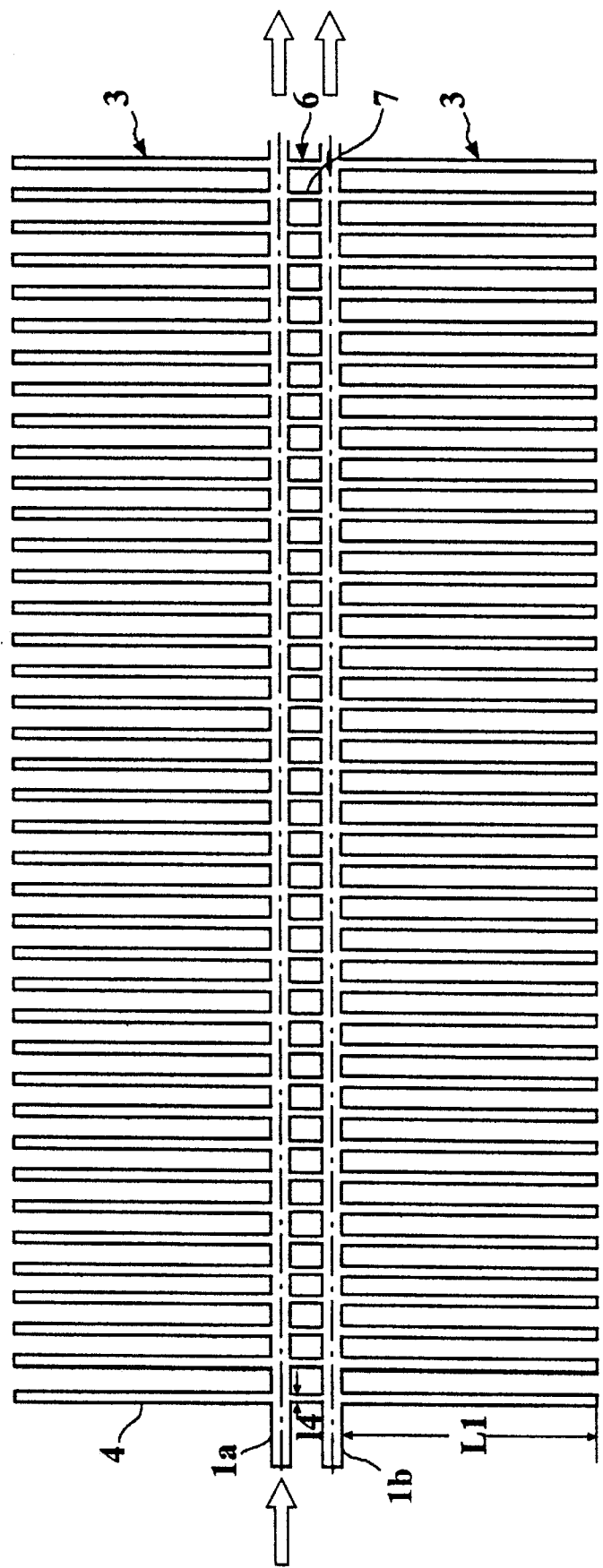
FIG. 5 represents a particular embodiment of the invention wherein the light wave guiding waveguide is formed by a coupler.

In FIG. 5, the light wave guiding waveguide is formed by a coupler comprising two parallel waveguides 1a and 1b. In the embodiment represented, the light is input to the component via the input of the guide 1a, the light being output partially via the guide 1a and, by coupling, via the guide 1b. The interactions between the two guides generally cause a tilt of the principal axes of each of the guides 1a and 1b. However the polarization state in the coupler becomes difficult to control when there is such a rotation of the principal axes. The use of structures of the same type as those described in FIGS. 1 to 3 enables this tilt of the principal axes of the guides 1a and 1b to be reduced or even compensated. In FIG. 5, two segmented plane guides 3 are disposed symmetrically, on each side of the assembly formed by the two guides 1a and 1b. Additional plane guides 5 may be provided, as in FIG. 2, and the guides 3 can be placed at a distance e from the corresponding guide 1a or 1b, as in FIG. 3.

In FIG. 5, an intermediate segmented plane guide 6 is disposed in the intermediate zone comprised between the guides 1a and 1b. The intermediate segmented plane guide 6 is formed by a plurality of parallel intermediate waveguides 7 disposed in the extension of the lateral waveguides 4 of the plane guides 3. The guides 7 have a width I4 smaller than the width I1 of the corresponding guides 4. Thus, in the component according to FIG. 5, the lateral segmented plane guides 3 periodically increase the birefringence of the guides 1a and 1b and, at the same time, compensate or reduce the tilt of their principal axes. The intermediate segmented plane guide 6 can be omitted to allow a better compensation of the tilt of the principal axes.

A symmetrical component with interactive waveguides according to FIG. 5 can be used notably for adiabatic or directional polarization maintaining couplers, for Y-junctions, for polarization separating couplers, and for phased array couplers. By a suitable choice of the size of the guides 4 and 7 and of their separating distance, it is possible to minimize losses, to redress the principal axes of the guides 1a and 1b and consequently improve their polarization maintaining properties while maximizing the birefringence of the light wave guiding waveguide.

FIGS. 6 to 9 illustrate components in which the structures acting on the light wave guiding waveguide are asymmetrical. This enables the tilt of the principal axes of the light wave guiding waveguide to be adjusted and the polarization of a light wave passing through this waveguide to be consequently modified in predetermined manner.

Figure 6:
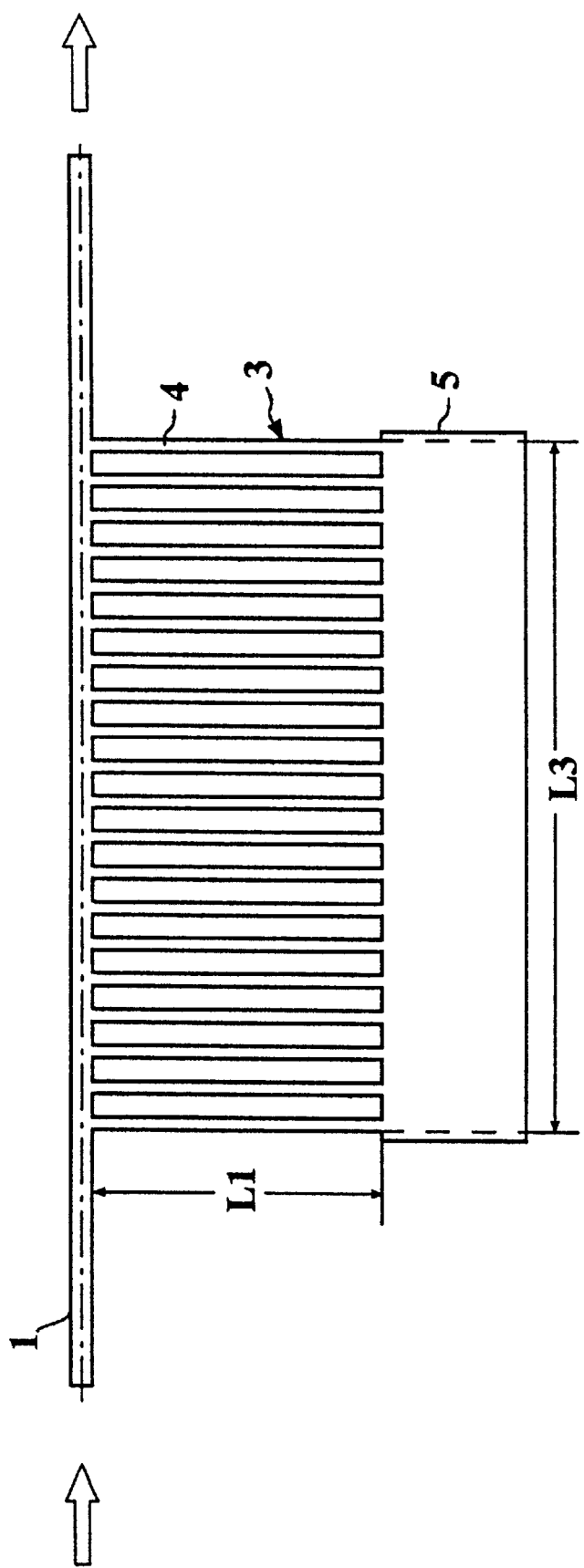
FIGS. 6 and 7 represent two particular embodiments of the invention, with a single segmented plane waveguide.

The component according to FIG. 6 is of the same type as that represented in FIG. 2, but with a single segmented plane waveguide 3 associated to an additional plane guide 5 disposed on one side of the light wave guiding waveguide 1. This asymmetry causes an asymmetrical distribution of the index field due to the geometry and to the stresses in the guide 1 and a rotation of angle Ø of its principal axes with respect to the principal axes of a symmetrical structure which are respectively perpendicular and parallel to the surface of the substrate. The characteristics of the segmented plane guide 3 enable the polarization state of the light on output from the guide 1 to be defined. As an example, if L3 corresponds to the beating half-length of the TE and TM modes, a light wave transmitted by the guide 1 undergoes a rotation of 2Ø of its linear polarization plane. For an excitation according to TE or TM and an angle of rotation Ø=45°, a TE/TM polarization converter is thus obtained. For an angle of rotation Ø=22.5°, the polarization plane rotates 45°, which corresponds to an equal distribution of the light between TE and TM for an input at the entry of the guide in TE only or in TM only.

With a length L3 equal to a quarter of the TE/TM beating length and an angle of rotation Ø=45°, a TE or TM wave is converted into a circular wave at the end of the guide 1 corresponding to the end of the plane guide 3. Thus, the required phase difference between the polarizations is fixed by the length L3 of the segmented plane guide 3. The tilt of the principal axes of the light wave guiding waveguide 1 is a function of the width I1, the length L1 and the spacing d of the lateral waveguides 4 of the segmented plane guide 3.

As in FIG. 1, the component according to FIG. 6 may not comprise any additional plane guide 5. The segmented plane guide 3 may, as represented in FIG. 7, be situated at a distance e from the guide 1.

Figure 7:
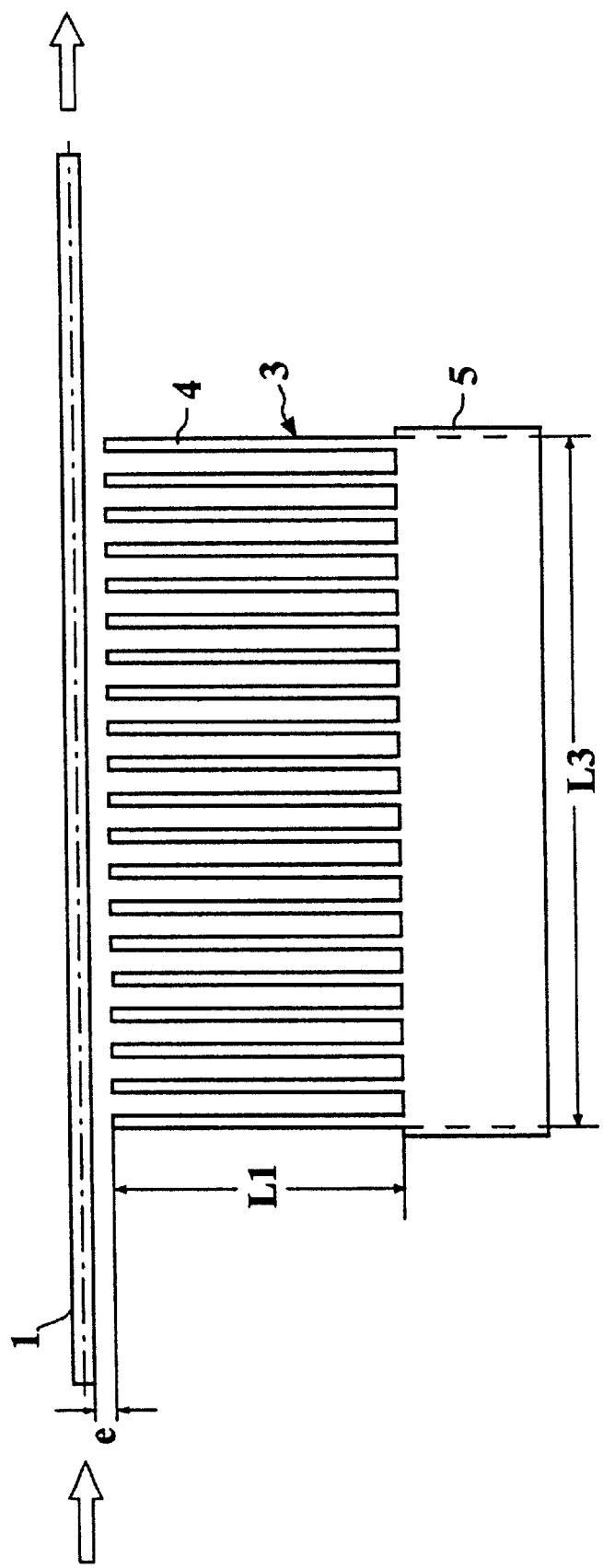
Figure 8:
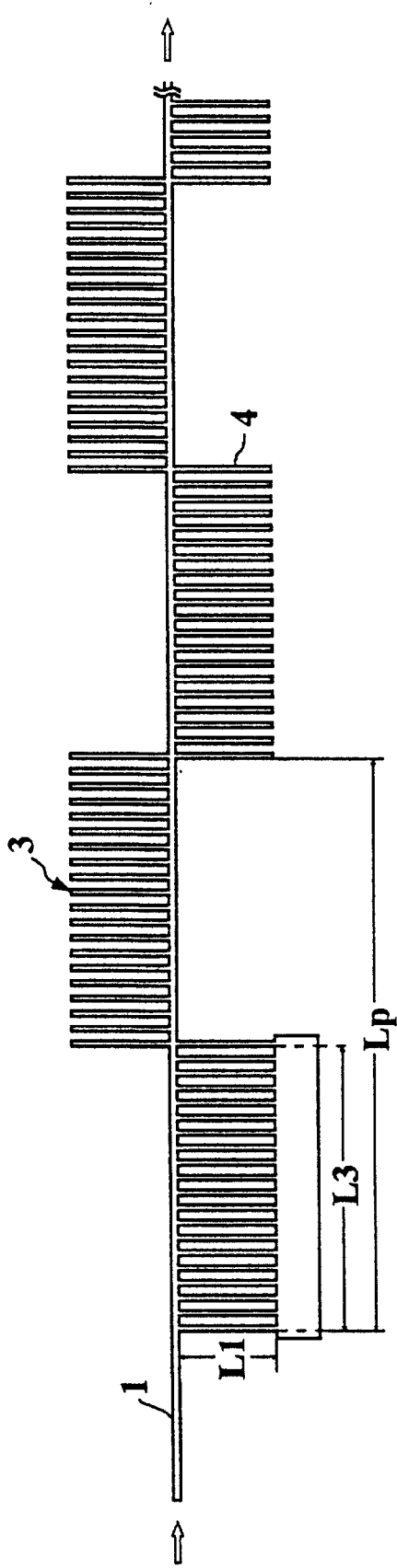
FIGS. 8 and 9 represent two particular embodiments of the invention, comprising segmented plane waveguides arranged alternately on each side of the light wave guiding waveguide.
Figure 9:
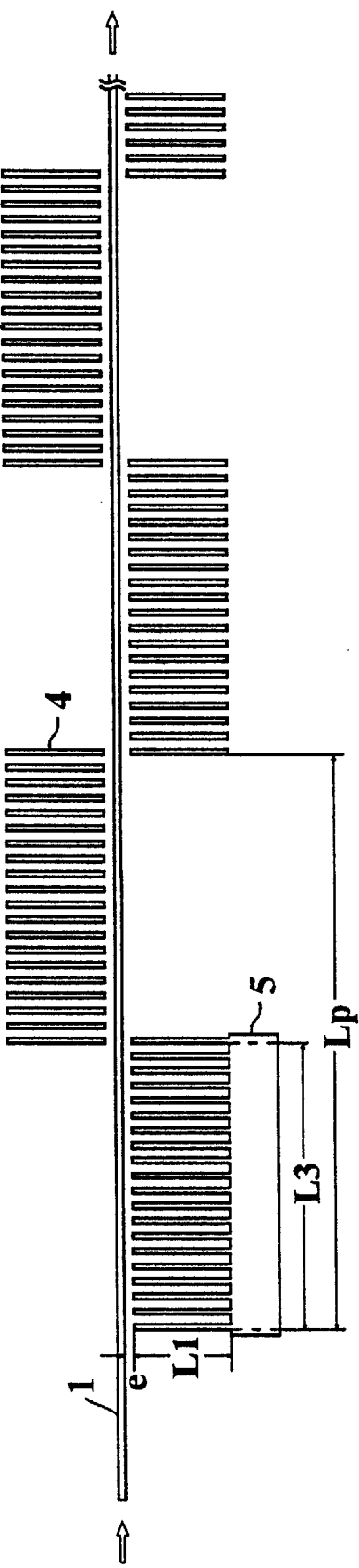

In FIGS. 8 and 9, segmented plane guides 3 are disposed alternately on each side of the guide 1 with a period Lp. In FIG. 8, the segmented plane guides 3 are, as in FIG. 6, in contact with the guide 1, whereas in FIG. 9 they are, as in FIG. 7, situated at a distance e from the guide 1.

A segmented plane guide 3 causes, as in FIGS. 6 and 7, a rotation of +Ø or −Ø of the principal axes of the guide 1. It can be shown that, with segmented plane guides 3 of a length L3 equal to the beating half-length of the TE and TM modes, the angle of rotation being Ø, the polarization of the incident wave has rotated +2Ø at the end of the first segmented plane guide, −4Ø at the end of the second segmented plane guide, disposed on the opposite side from the first one, and +6Ø at the end of the third segmented plane guide. More generally, the polarization rotation is $(-1)^n 2n\emptyset$ after an alternation of n segmented plane guides arranged longitudinally alternately on each side of the guide 1. Large and precise rotations of the polarization state can thus be obtained. By placing a polarizer at the end of the guide 1, the device operates as a birefringent optical filter of the "SOLC" type.

By making the angle of rotation and the length L3 of each section of the guide 1 whose principal axes are tilted vary independently, it is possible to achieve any polarization transfer function very simply and to achieve a narrow bandpass filter usable in particular in optical sensors and optical communication.

The arrangements of FIGS. 8 and 9 can also be applied in the case where, as in FIG. 5, the light wave guiding waveguide is formed by two coupled parallel light wave guiding waveguides 1a and 1b. The rotation of their principal axes can thus be adjusted asymmetrically and components can be achieved designed to adjust the polarization of a light wave which it would be very difficult, or even impossible, to achieve with optical fibers.

Segmented plane guides can also be arranged in asymmetrical manner alternately on each side of an asymmetric coupler formed by two parallel light wave guiding waveguides 1a and 1b of different widths. They can thus both eliminate the angle of rotation created by the asymmetric coupler and synchronize the two refractive indexes of the two parallel waveguides 1a and 1b for a first polarization state (TM for example), while desynchronizing them for the other polarization state (TE) perpendicular to the first. In such a case, for the synchronized polarization state (TM) there will be coupling between the incident waveguide 1a and the second waveguide 1b of the coupler, whereas for the non-synchronized synchronization state (TE), there will not be any coupling. This notably enables a compact TE/TM polarization separator of small length to be achieved.

All the structures applying stresses on the light wave guiding waveguide described above act in passive manner. It is therefore not necessary, for their operation, to perform external adjustment. However, a more precise control of the birefringence and of the angle of rotation of the principal axes of the light wave guiding waveguide can be achieved by deposition of an additional planar layer on the whole surface of the component.

It is moreover possible, in known manner, to make the phase difference between the waves TE and TM and the angle Ø vary by thermo-optical, electro-optical, chemico-optical or other effect, which enables in particular controllable optical filters to be achieved for asymmetrical structures and, possibly, a rotation of the axes to be created for symmetrical structures.

The invention is not limited to the ion exchange technique described above but can be used with any known integrated optics technique. The waveguides can be formed in the substrate or on the substrate. Depending on the technique used, there may be variations in the mode of action of the structures introducing an anisotropy on the light wave guiding waveguide. The modifications of the anisotropy of the guide may be due to a geometry effect of the structure or to the stresses. In all cases, the component can be achieved easily and precisely by a simple predetermined geometrical arrangement of segmented plane waveguides 3 and, possibly, of additional plane guides 5.

What is claimed is:

1. A light polarization device, comprising (a) a glass substrate;

(b) at least one longitudinal waveguide having a longitudinal axis arranged within and extending continuously across said substrate for transmitting a light wave applied to an input thereof; and (c) at least one segmented planar waveguide arranged within said substrate and extending laterally from said longitudinal waveguide, said segmented planar waveguide including a plurality of equally spaced parallel waveguide elements arranged perpendicular to said longitudinal waveguide, each of said waveguide elements being configured to have refractive indices less than or equal to corresponding refractive indices of said longitudinal waveguide, said segmented waveguide elements applying mechanical stresses on said longitudinal waveguide to increase the birefringence of said longitudinal waveguide.

2. A device of claim 1, wherein segmented planar waveguides are symmetrically arranged on each side of said longitudinal waveguide.

3. A device of claim 1, wherein segmented planar waveguides are asymmetrically arranged on each side of said longitudinal waveguide.

4. A device of claim 1, wherein said segmented planar waveguide is spaced from said longitudinal waveguide by a given distance.

5. A device of claim 1, and further comprising at least a third planar waveguide in said surface extending from ends of said segmented waveguide elements opposite said longitudinal waveguide.

6. A device of claim 1, wherein a pair of parallel spaced longitudinal waveguides are arranged in said substrate.

7. A device of claim 6, further comprising spaced intermediate waveguides in said surface arranged perpendicular to and extending continuously between said pair of longitudinal waveguides.

8. A device of claim 7, wherein said intermediate waveguides have a width less than the width of said segmented waveguide elements.

* * * * *